(12) United States Patent
Knortz

(10) Patent No.: US 11,512,602 B2
(45) Date of Patent: Nov. 29, 2022

(54) SEAL ELEMENT FOR SEALING A JOINT BETWEEN A ROTOR BLADE AND A ROTOR DISK

(71) Applicant: United Technologies Corporation, Farmington, CT (US)

(72) Inventor: Christopher J. Knortz, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 60 days.

(21) Appl. No.: 16/747,089

(22) Filed: Jan. 20, 2020

(65) Prior Publication Data

US 2021/0222571 A1   Jul. 22, 2021

(51) Int. Cl.
*F01D 5/30* (2006.01)
*F01D 11/00* (2006.01)

(52) U.S. Cl.
CPC ............. *F01D 5/30* (2013.01); *F01D 11/006* (2013.01); *F05D 2240/30* (2013.01); *F05D 2240/55* (2013.01)

(58) Field of Classification Search
None
See application file for complete search history.

(56) References Cited

U.S. PATENT DOCUMENTS

| | | | |
|---|---|---|---|
| 3,918,842 A | 11/1975 | Longley | |
| 4,500,098 A * | 2/1985 | Wilcox | F16J 15/164 277/641 |
| 5,257,909 A | 11/1993 | Glynn | |
| 5,478,207 A | 12/1995 | Stec | |
| 6,315,298 B1 * | 11/2001 | Kildea | F01D 11/006 277/433 |
| 6,375,429 B1 | 4/2002 | Halila | |
| 6,565,322 B1 | 5/2003 | Lieser | |
| 6,682,307 B1 | 1/2004 | Tiemann | |
| 6,832,892 B2 * | 12/2004 | Murphy | F01D 5/3038 29/889.22 |
| 8,215,914 B2 | 7/2012 | Danescu | |
| 9,175,573 B2 | 11/2015 | Cairo | |
| 9,470,098 B2 | 10/2016 | Latimer | |
| 10,393,135 B2 | 8/2019 | Montgomery | |
| 2007/0280831 A1 | 12/2007 | Pickens | |
| 2013/0187307 A1 * | 7/2013 | Kopmels | F01D 9/044 264/261 |

FOREIGN PATENT DOCUMENTS

DE       2658345 A1      6/1978

OTHER PUBLICATIONS

EP search report for EP20208865.4 dated May 4, 2021.

* cited by examiner

*Primary Examiner* — Courtney D Heinle
*Assistant Examiner* — Jason Fountain
(74) *Attorney, Agent, or Firm* — Getz Balich LLC

(57) ABSTRACT

A rotor assembly is provided for a piece of rotational equipment. This rotor assembly includes a rotor disk, a rotor blade and a seal element. The rotor disk is configured to rotate about a rotational axis. The rotor blade includes an airfoil, a platform and a mount attaching the rotor blade to the rotor disk. The seal element is seated in a groove of the rotor disk. The seal element is configured to sealingly engage the platform and the mount.

10 Claims, 18 Drawing Sheets

SEAL ELEMENT FOR SEALING A JOINT BETWEEN A ROTOR BLADE AND A ROTOR DISK

This invention was made with Government support awarded by the United States. The Government has certain rights in this invention.

BACKGROUND OF THE DISCLOSURE

1. Technical Field

This disclosure relates generally to rotational equipment and, more particularly, to sealing a joint between a rotor blade and a rotor disk.

2. Background Information

A rotor assembly for a gas turbine engine may include a plurality of rotor blades arranged around a rotor disk. Each rotor blade may be mounted to the rotor disk by a mechanical joint such as, for example, a dovetail interface. A component such as a damper may also be arranged between a lug of the rotor disk and the rotor blade to dampen vibrations induced during rotation of the rotor assembly. While various types and configurations of rotor assemblies are known in the art, there is still room in the art for improvement. In particular, there is need in the art for reducing fluid leakage through mechanical joints between rotor blades and a rotor disk.

SUMMARY OF THE DISCLOSURE

According to an aspect of the present disclosure, a rotor assembly is provided for a piece of rotational equipment. This rotor assembly includes a rotor disk, a rotor blade and a seal element. The rotor disk is configured to rotate about a rotational axis. The rotor blade includes an airfoil, a platform and a mount attaching the rotor blade to the rotor disk. The seal element is seated in a groove of the rotor disk. The seal element is configured to sealingly engage the platform and the mount.

According to another aspect of the present disclosure, a rotor assembly is provided for a turbine engine. This rotor assembly includes a rotor disk, a rotor blade and a seal element. The rotor disk is configured to rotate about a rotational axis. The rotor disk includes a first lug, a second lug and a slot laterally between and formed by the first lug and the second lug. The rotor blade includes an airfoil, a platform and a mount seated within the slot. The seal element is configured to at least partially seal a gap between the first lug and the platform. The seal element is also configured to at least partially seal a gap between the first lug and the mount.

According to still another aspect of the present disclosure, another rotor assembly is provided for a turbine engine. This rotor assembly includes a rotor disk, a rotor blade and a seal element. The rotor disk is configured to rotate about a rotational axis. The rotor disk includes a first lug, a second lug and a slot laterally between and formed by the first lug and the second lug. The rotor blade includes an airfoil, a platform and a mount seated within the slot. The seal element extends laterally along the first lug. The seal element is located radially between the rotor disk and the platform. The seal element is configured as a rope seal element, a wire seal element or a polymer seal element.

The mount may include a root and a neck. The seal element may be configured to sealingly engage the neck.

The seal element may be configured to: radially abut against the platform; and laterally abut against the mount.

The rotor disk may include a lug and a slot partially formed by the lug. The mount may be seated within the slot. The seal element may extend laterally across the lug.

The seal element may follow a longitudinal centerline. A portion of the longitudinal centerline may extend along and may be parallel with the mount.

The seal element may be configured as or otherwise include an elongated seal element that follows a longitudinal centerline with a tortuous trajectory.

The seal element may be configured as or otherwise include an elongated seal element. A first length of the elongated seal element may follow a first trajectory. A second length of the elongated seal element may follow a second trajectory that is angularly offset from the first trajectory.

A platform seal may be included. The platform seal may be configured to sealingly engage the platform and retain the seal element within the groove.

The seal element may be wrapped around the platform seal.

The seal element may be configured as or otherwise include a rope seal element.

The seal element may be configured as or otherwise include a wire seal element.

The seal element may be configured from or otherwise include polymeric material.

The seal element may be configured from or otherwise include sheet metal.

An inner surface of the platform may extend radially inwards as the inner surface extends from a lateral distal edge of the platform to the mount. A lug surface of the rotor disk may follow the inner surface.

The rotor blade may be configured as or otherwise include a compressor blade.

The seal element may be configured as an elongated compliant seal element.

At least a portion of the seal element may extend laterally along an inner surface of the platform.

A second portion of the seal element may extend axially along the mount.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
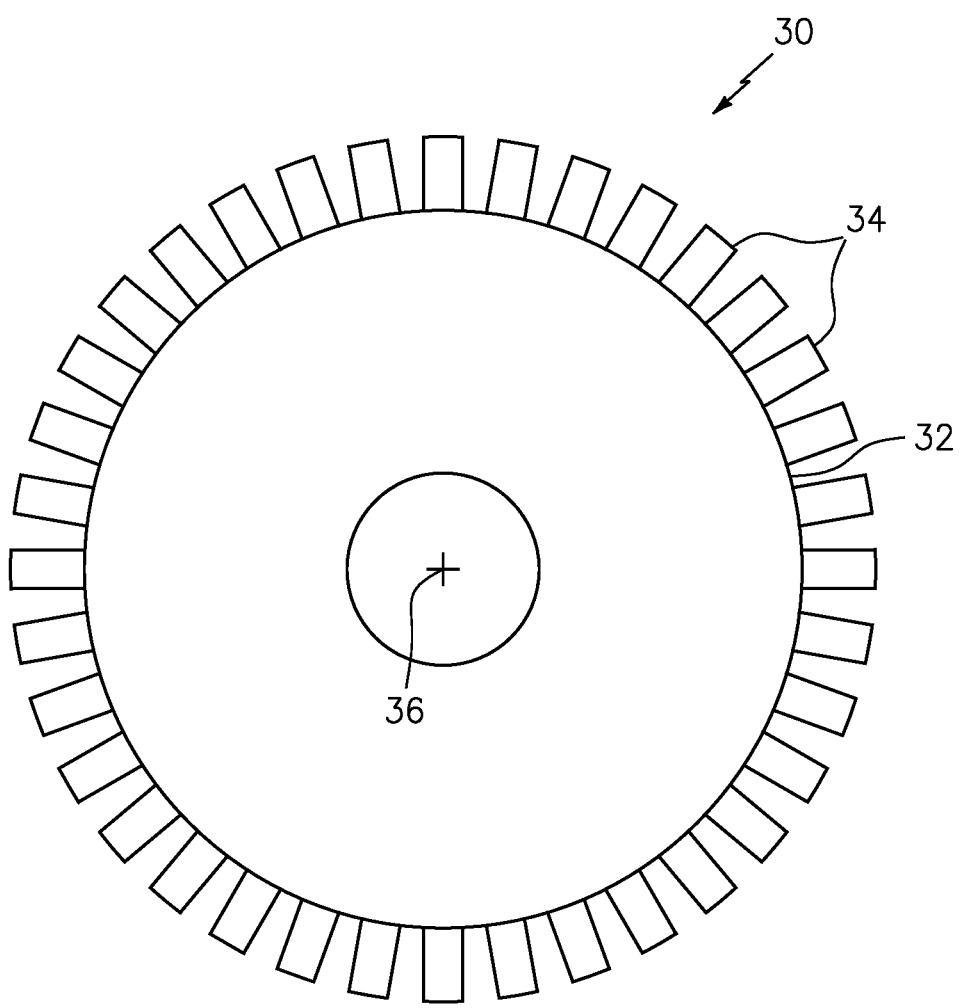
FIG. 1 is a schematic illustration of a bladed rotor assembly.

FIG. 1 illustrates a bladed rotor assembly 30 for a piece of rotational equipment. An example of such a piece of rotational equipment is a gas turbine engine for an aircraft propulsion system, an exemplary embodiment of which is described below in further detail with respect to FIG. 22. However, the rotor assembly 30 of the present disclosure is not limited to such an aircraft application nor a gas turbine engine application. The rotor assembly 30, for example, may alternatively be configured with rotational equipment such as an industrial gas turbine engine, a wind turbine, a water turbine or any other apparatus which includes a bladed rotor.

The rotor assembly 30 of FIG. 1 includes a rotor disk 32 and a plurality of rotor blades 34; e.g., compressor blades. The rotor disk 32 of FIG. 1 is configured to rotate about a rotational axis 36, which may also be an axial centerline of the rotor assembly 30 and/or the piece of rotational equipment.

Figure 2:
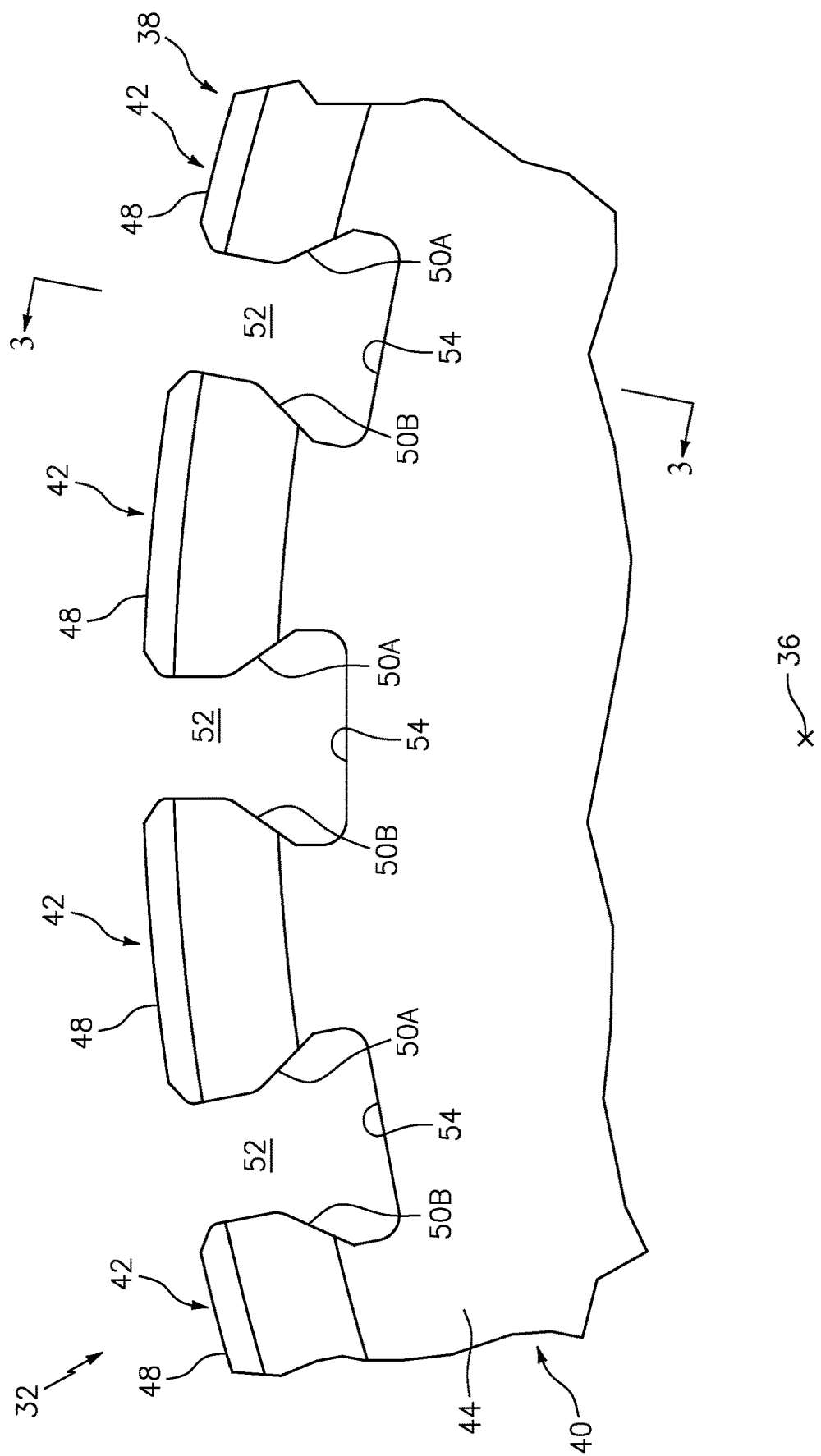
FIG. 2 is a partial illustration of a rim of a rotor disk.

Referring to FIG. 2, the rotor disk 32 includes a rim 38 at a radial outer periphery of the rotor disk 32. This rim 38 includes a rim base 40 and a plurality of rim lugs 42.

Figure 3:
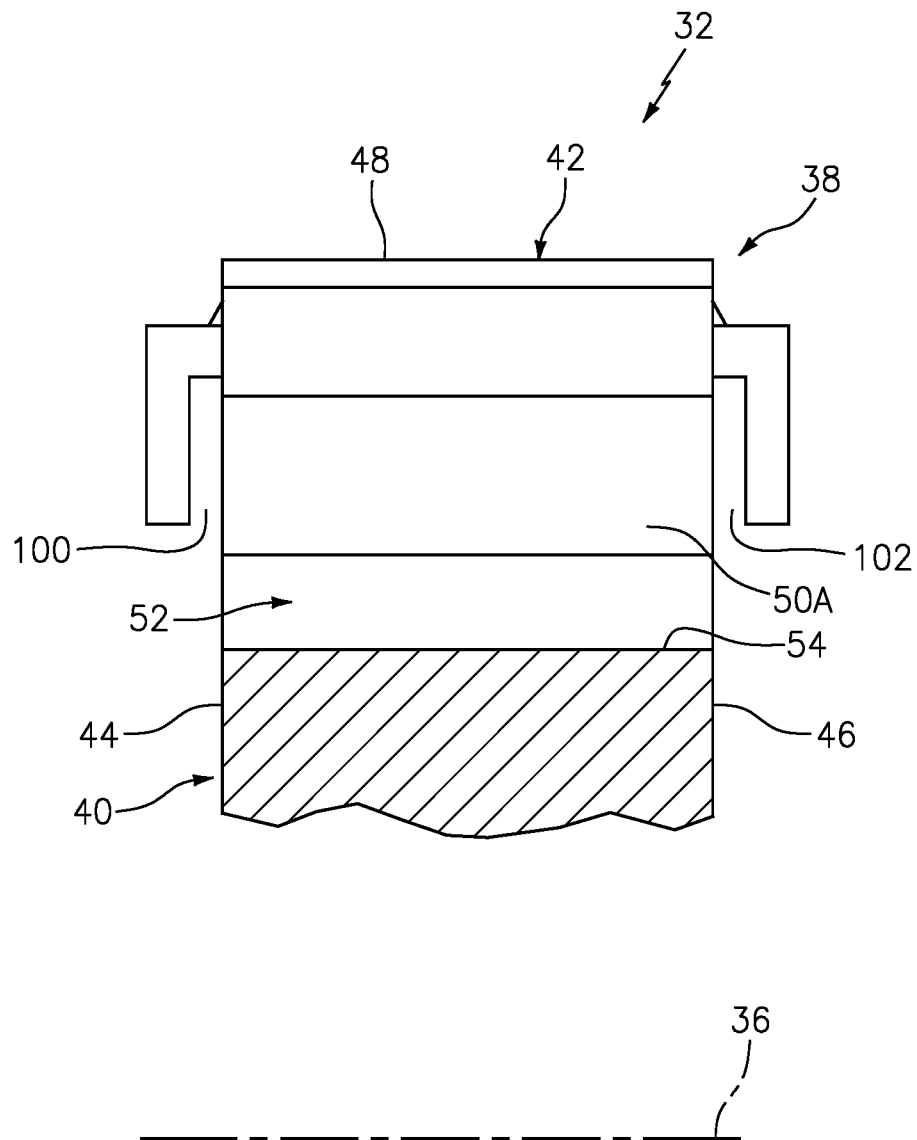
FIG. 3 is a partial side sectional illustration of the rotor disk rim taken along line 3-3 in FIG. 2.

The rim base 40 extends circumferentially about (e.g., completely around) the rotational axis 36. Referring to FIG. 3, the rim base 40 extends axially along the rotational axis 36 between a first (e.g., forward and/or upstream) end 44 of the rim 38 and a second (e.g., aft and/or downstream) end 46 of the rim 38.

The rim lugs 42 of FIG. 2 are arranged circumferentially about the rim base 40 and the rotational axis 36 in an annular array. Each of the rim lugs 42 projects radially out, in an outward direction relative to the rotational axis 36, from an outer periphery of the rim base 40 a respective distal lug end surface 48. Each of the rim lugs 42 extends laterally (e.g., in a circumferential or tangential direction relative to the rotational axis 36) between opposing lug first and second side surfaces 50A and 50B (generally referred to as "50"). Referring to FIG. 3, each of the rim lugs 42 extends (e.g., substantially) axially along the rotational axis 36 between the rim first end 44 and the rim second end 46.

Referring to FIG. 2, the rim lugs 42 are circumferentially spaced about (e.g., completely around) the rotational axis 36 so as to form an annular array of mount slots 52. Each of the mount slots 52 is disposed laterally between and formed by a circumferentially adjacent/neighboring pair of the rim lugs 42 and their side surfaces 50. Each mount slot 52 extends radially inward into the rotor disk 32 from respective distal lug end surfaces 48 to a respective slot end surface 54; e.g., a slot bottom surface. Each mount slot 52 extends laterally between a respective one of the lug first side surfaces 50A and a respective one of the lug second side surfaces 50B. Each mount slot 52 may extend (e.g., substantially) axially through (or axially into) the rotor disk 32 as shown, for example, in FIG. 3.

Figure 4:
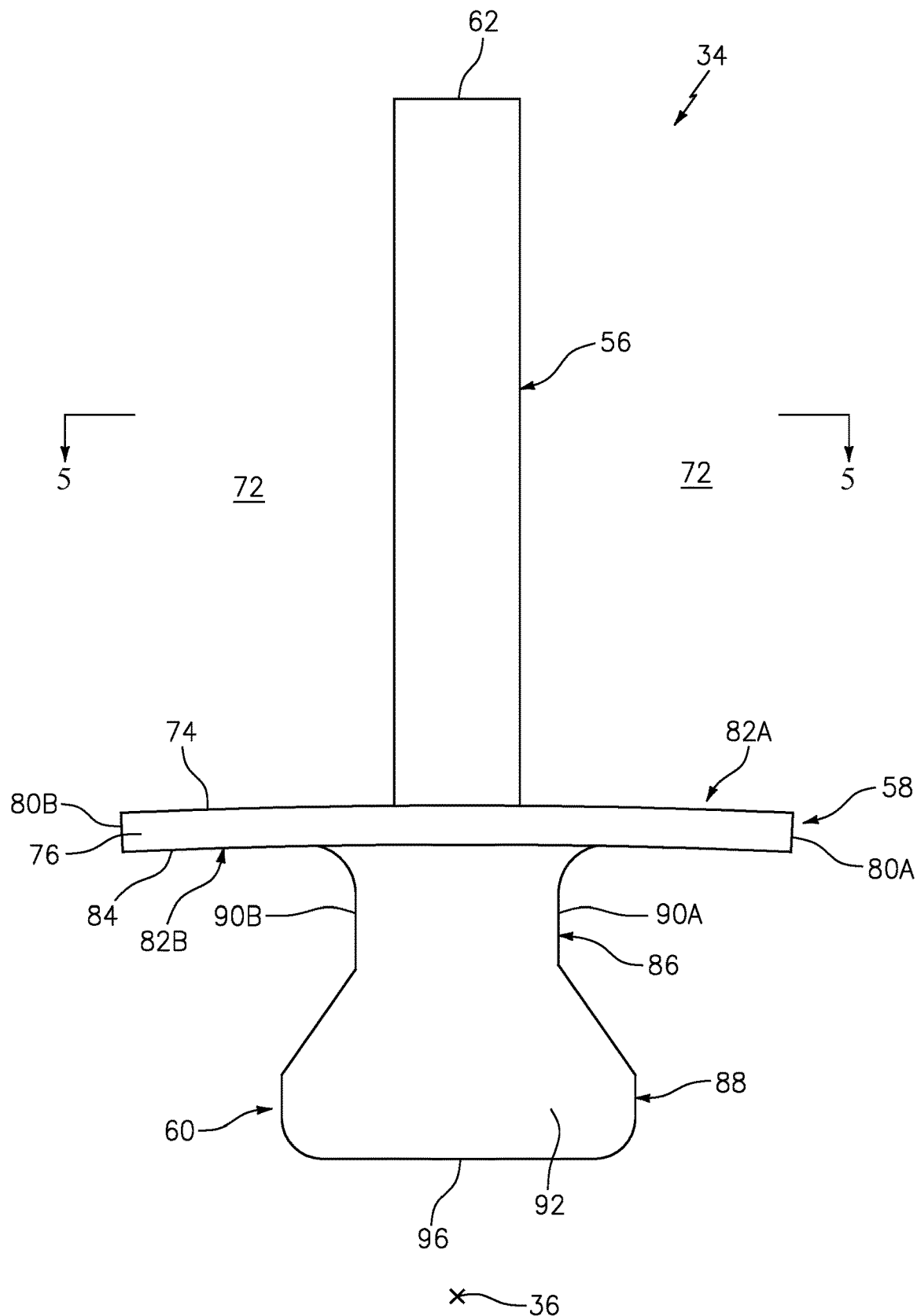
FIG. 4 is a schematic illustration of a rotor blade.
Figure 5:
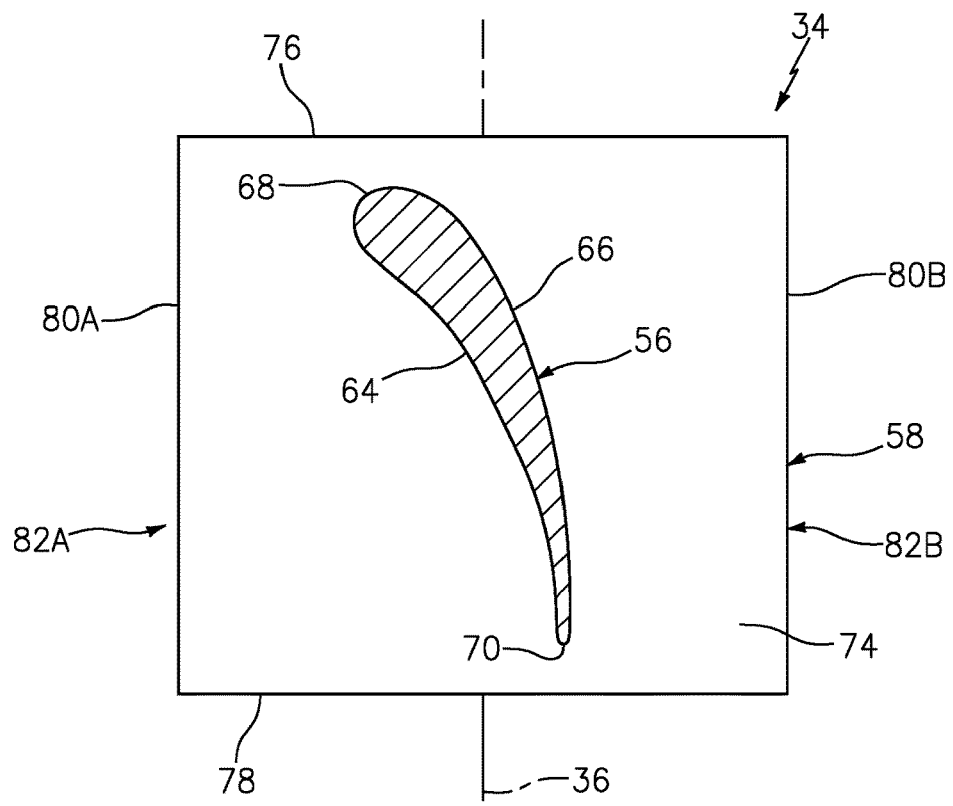
FIG. 5 is a cross-sectional illustration of the rotor blade taken along line 5-5 in FIG. 4.

Referring to FIG. 4, each rotor blade 34 includes a rotor blade airfoil 56, a rotor blade platform 58 and a rotor blade mount 60. The rotor blade airfoil 56 projects radially out from the rotor blade platform 58 in a spanwise direction to a (e.g., unshrouded) airfoil tip 62. Referring to FIG. 5, the rotor blade airfoil 56 includes an airfoil first (e.g., pressure and/or concave) side surface 64 and an airfoil second (e.g., suction and/or convex) side surface 66. These first and second side surfaces 64 and 66 extend along a chord line of the airfoil 56 between and meet at an airfoil (e.g., forward and/or upstream) leading edge 68 and an airfoil (e.g., aft and/or downstream) trailing edge 70.

The rotor blade platform 58 of FIG. 4 is radially between and connected to the rotor blade airfoil 56 and the rotor blade mount 60. The rotor blade platform 58 is configured to form a portion of an inner peripheral boarder of a gas path 72 (e.g., a core gas path) extending axially across the rotor assembly 30; e.g., a gas path into which the rotor blade airfoils 56 radially extend. The rotor blade platform 58 of FIG. 5, for example, includes an outer platform surface 74 that extends axially along the rotational axis 36 between a platform first (e.g., forward and/or upstream) edge 76 and a platform second (e.g., aft and/or downstream) edge 78. The outer platform surface 74 extends circumferentially between opposing platform first and second side edges 80A and 80B (generally referred to as "80").

Referring to FIG. 4, the rotor blade platform 58 is configured with a platform first side segment 82A (e.g., a side projection and/or wing) and a platform second side segment 82B (e.g., a side projection and/or wing), which segments 82A and 82B are generally referred to as "82". The platform first side segment 82A projects circumferentially away from the airfoil 56 and the mount 60 to the first side edge 80A. This platform first side segment 82A is thereby cantilevered from the mount 60. The platform first side segment 82A extends radially between the outer platform surface 74 and a first segment of an inner platform surface 84. The platform second side segment 82B projects circumferentially away from the airfoil 56 and the mount 60 to the second side edge 80B. This platform second side segment 82B is thereby cantilevered from the mount 60. The platform second side segment 82B extends radially between the outer platform surface 74 and a second segment of inner platform surface 84.

Figure 6:
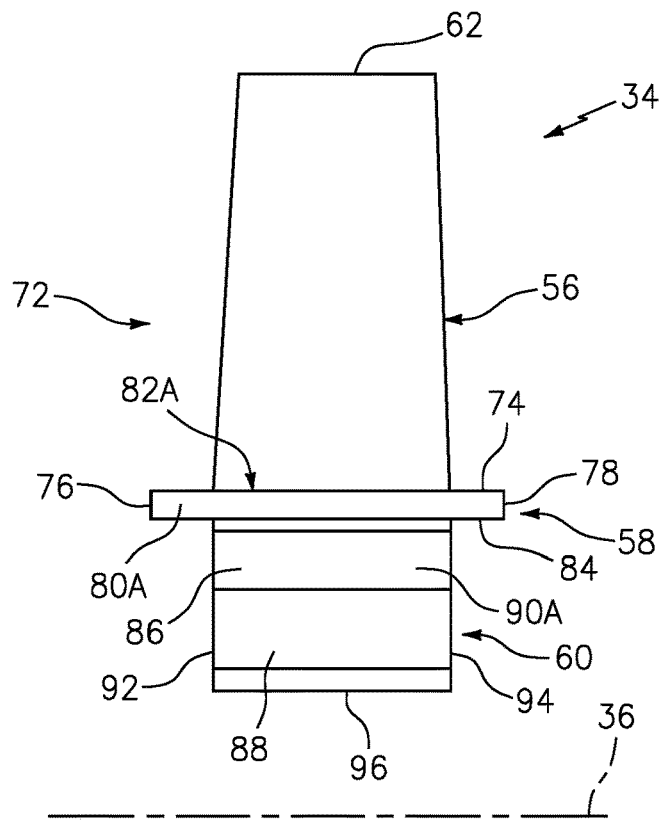
FIG. 6 is a side schematic illustration of the rotor blade.

The rotor blade mount 60 of FIG. 4 includes a mount neck 86 and a mount root 88. The mount neck 86 extends radially between and is connected to the rotor blade platform 58 and the mount root 88. The mount neck 86 extends laterally between opposing neck first and second side surfaces 90A and 90B (generally referred to as "90"). Referring to FIG. 6, the mount neck 86 extends (e.g., substantially) axially along the rotational axis 36 between a first (e.g., forward and/or upstream) end 92 of the mount 60 and a second (e.g., aft and/or downstream) end 94 of the mount 60.

The mount root 88 extends (e.g., substantially) axially along the rotational axis 36 between the mount first end 92 and the mount second end 94. The mount root 88 of FIG. 4 flares laterally out from the mount neck 86 so as to form, for example, a dovetail attachment. The present disclosure, however, is not limited to such an exemplary attachment configuration. The mount root 88 projects radially inward from the mount neck 86 to a mount distal end surface 96; e.g., a mount bottom surface.

Figure 7:
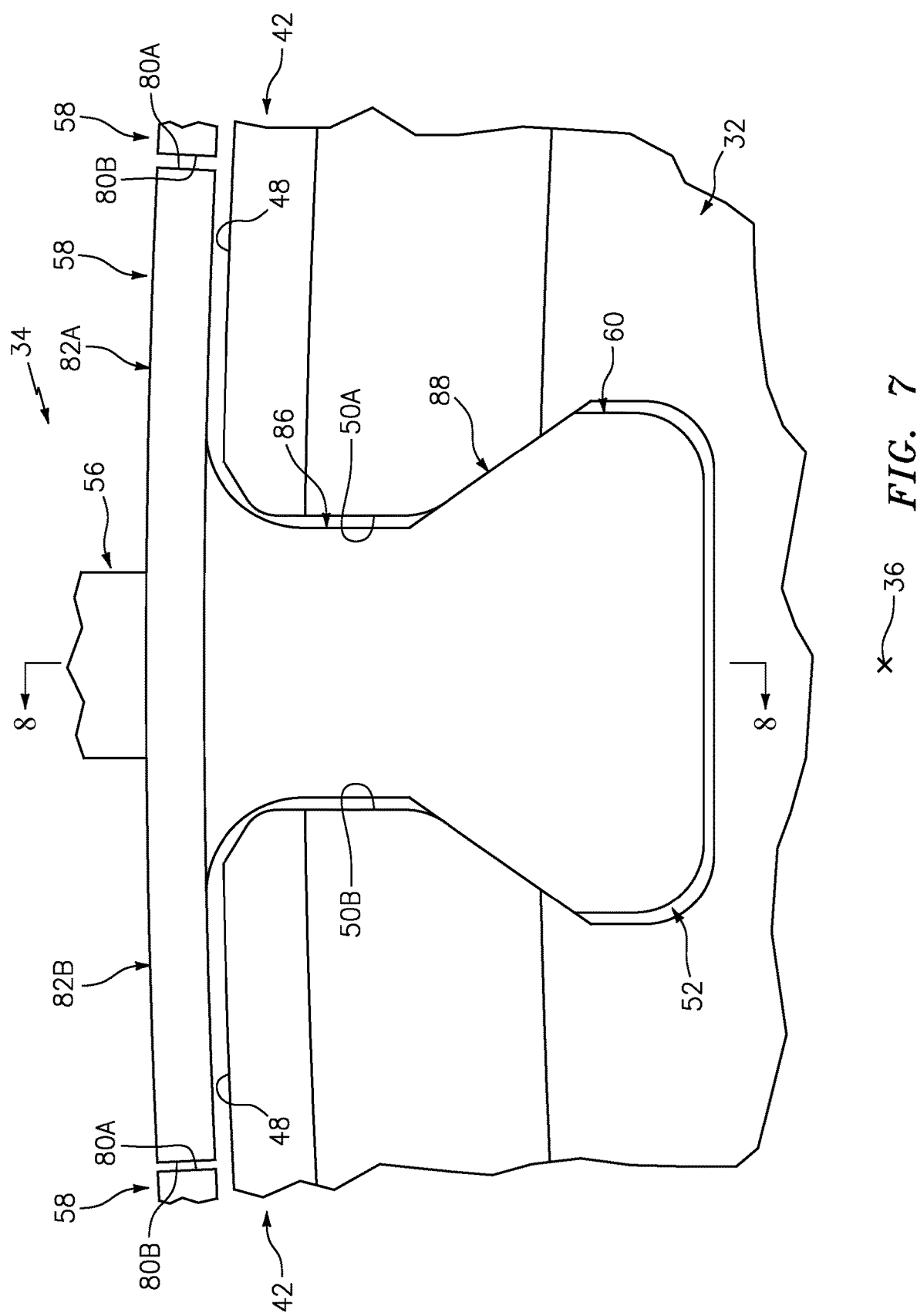
FIG. 7 is a partial illustration of interfaces between a plurality of the rotor blades and the rotor disk, where platforms of two of the rotor blades are partially shown.
Figure 8:
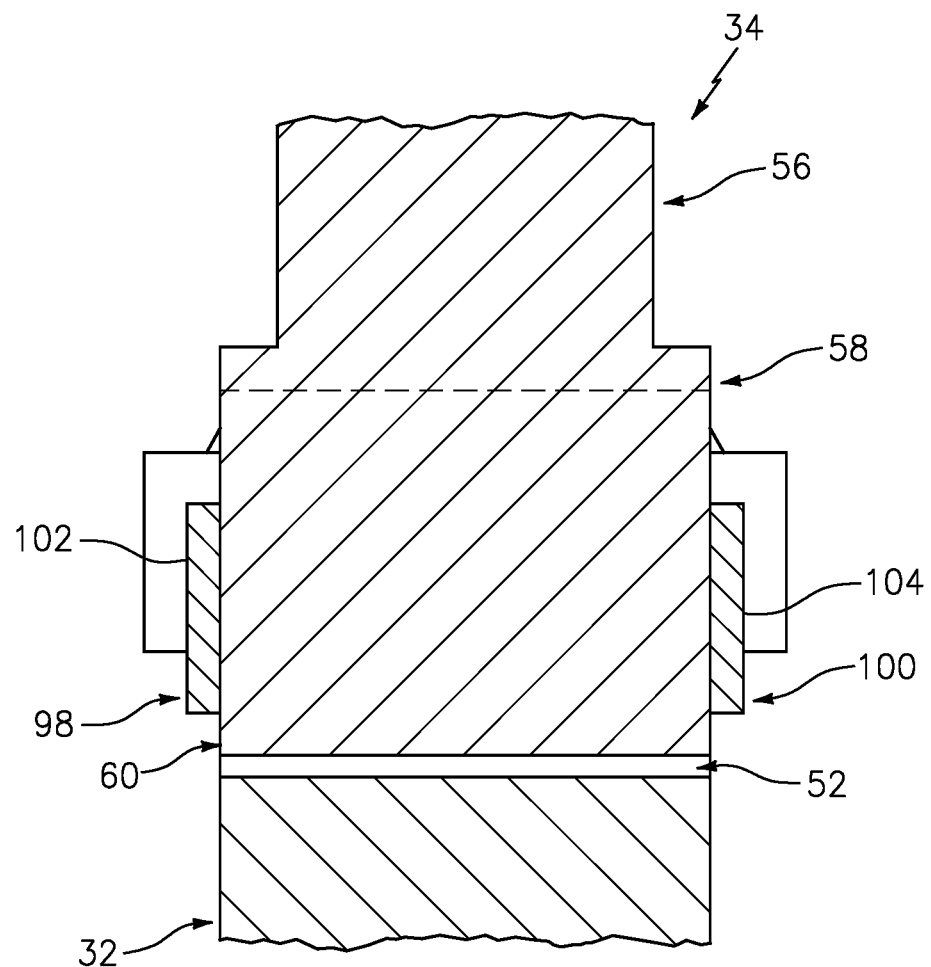
FIG. 8 is a partial side sectional illustration of the interface taken along line 8-8 in FIG. 7.
Figure 8:

Referring to FIG. 7, the rotor blades 34 are arranged circumferentially around the rotor disk 32 and the rotational axis 36 in an annular array. Each of the rotor blades 34 is attached to the rotor disk 32 via a mechanical joint; e.g., a dovetail interface. The rotor blade mount 60 of each rotor blade 34, for example, is mated with (e.g., slide into and seated within) a respective one of the mount slots 52 in the rotor disk 32. Referring to FIG. 8, the rotor blade mounts 60 may be axially secured within the mount slots 52 using one or more retainers 98 and 100 (e.g., retaining rings) respectively seated in retainer slots 102 and 104 in the rim base 40. The present disclosure, however, is not limited to the foregoing exemplary retainer configuration.

Referring to FIG. 7, during rotational equipment operation and/or rotation of the rotor assembly 30 about its rotational axis 36, fluid (e.g., compressed air) may leak across the rotor assembly 30. For example, the fluid may leak axially through radial gaps between the rim lugs 42 and the rotor blade platforms 58. Fluid may also or alternatively leak axially through lateral gaps between the rim lugs 42 and the rotor blade mounts 60. Fluid may still also or alternatively leak radially through lateral gaps between the platform edges 80. Such leakage may reduce performance of the rotational equipment. Therefore, to reduce and/or prevent such fluid leakage across the rotor assembly 30, the rotor assembly 30 of the present disclosure further includes a seal assembly 106, examples of which are shown in FIGS. 9-21.

Figure 9:
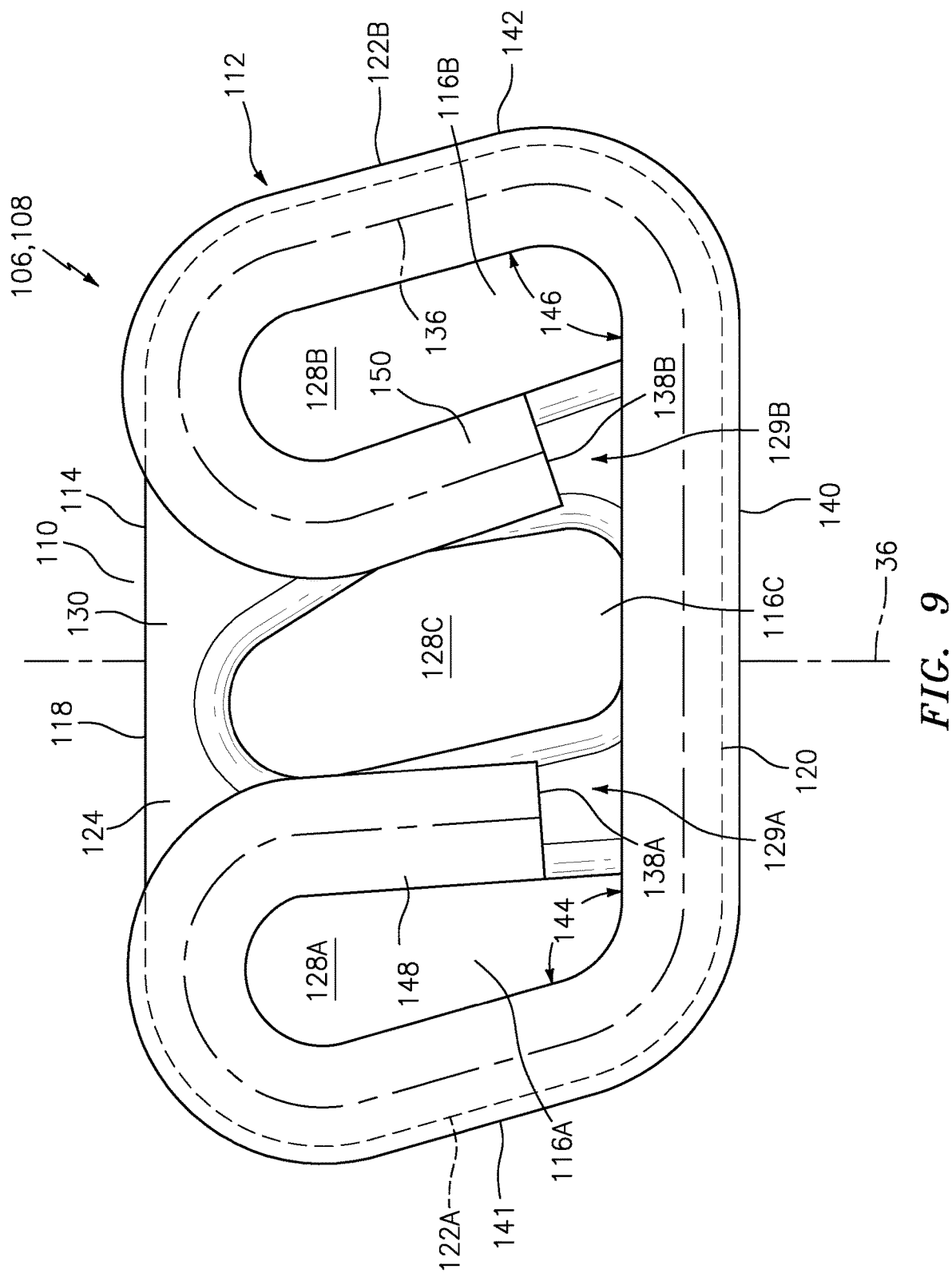
FIG. 9 is an illustration of an inner side of a platform seal mated with a seal element.
Figure 10:
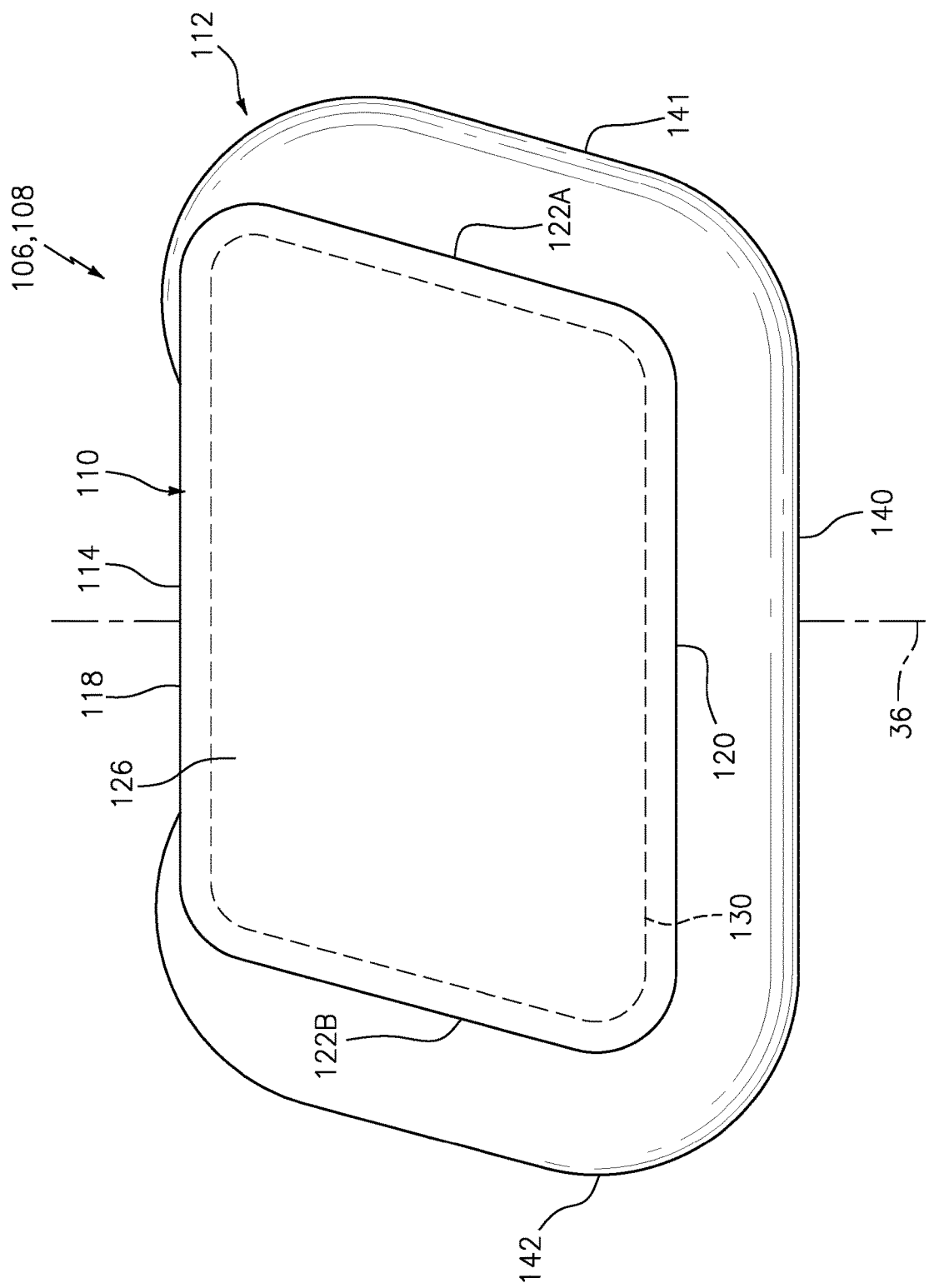
FIG. 10 is an illustration of an outer side of the platform seal and the seal element.

The seal assembly 106 of FIGS. 9 and 10 includes a plurality of seal component pairs 108, an exemplary one of which is shown. Each seal component pair 108 includes a platform seal 110 and a seal element 112.

The platform seal 110 includes a platform seal base 114 (e.g., a base plate) and one or more seal element locators 116A, 116B and 116C (generally referred to as "116") (e.g., projections, pedestals, etc.). Referring to FIG. 10, the platform seal base 114 extends (e.g., substantially) axially along the rotational axis 36 between a seal base first (e.g., forward and/or upstream) end 118 and a seal base second (e.g., aft and/or downstream) end 120. The platform seal base 114 extends laterally (e.g., circumferentially) between opposing seal base first and second sides 122A and 122B (generally referred to as "122"). The platform seal base 114 extends vertically (e.g., radially) between a platform seal inner surface 124 (see FIG. 9) and a platform seal outer surface 126 (see FIG. 10).

Referring to FIG. 9, the element locators 116 are connected to the platform seal base 114. Each of the element locators 116 projects vertically out from the platform seal base 114 and its platform seal inner surface 124 to a respective distal locator end 128A, 128B, 128C (generally referred to as "128"). The element locators 116 are arranged laterally along the platform seal inner surface 124. The first element locator 116A is disposed at (e.g., on, adjacent or proximate) the seal base first side 122A. The second element locator 116B is disposed at the seal base second side 122B. The third element locator 116C is disposed laterally between the first and the second element locators 116A and 116B; e.g., laterally centered on the platform seal inner surface 124.

With the foregoing configuration, the platform seal 110 of FIG. 9 is configured with a plurality of grooves 129A and 129B (generally referred to as "129") and a rim shelf 130. The first groove 129A is formed laterally between the first element locator 116A and the third element locator 116C. The second groove 129B is formed laterally between the second element locator 116B and the third element locator 116C. The rim shelf 130 extends (e.g., completely, or partially) around an outer perimeter of the platform seal 110; e.g., see dashed line in FIGS. 9 and 10. However, in other embodiments, the rim shelf 130 may only extend along a portion of the outer perimeter of the platform seal 110; e.g., partially or completely along one or each of the ends 118 and 120 and/or partially or completely along one or each of the sides 122. In still other embodiments, the platform seal 110 may be configured without the rim shelf 130.

Each platform seal 110 may be configured as a monolithic body. The term "monolithic" may describe a single unitary body formed without severable components. For example, each platform seal 110 may be laid up, cast, machined and/or otherwise formed from a single body of material. In another example, each platform seal 110 may be formed from a plurality of discretely formed segments which are subsequently permanently bonded together; e.g., welded, adhered, etc. By contrast, the term "non-monolithic" may described a body formed from a plurality of discretely formed bodies that are severable; e.g., may be disassembly from one another. The present disclosure, however, is not limited to monolithic platform seals.

The platform seal 110 is formed from platform seal material. Examples of the platform seal material may include, but are not limited to, metal, polymeric material and ceramic material. Examples of the metal include, but are not limited to, aluminum (Al), nickel (Ni), titanium (Ti), and alloys of any one or more of the foregoing. Examples of the polymetric material may include, but are not limited to, fiber-reinforced thermoplastic material and fiber-reinforced thermoset material. An example of the ceramic material is, but is not limited to, ceramic matrix composite (CMC) material.

Figure 11:
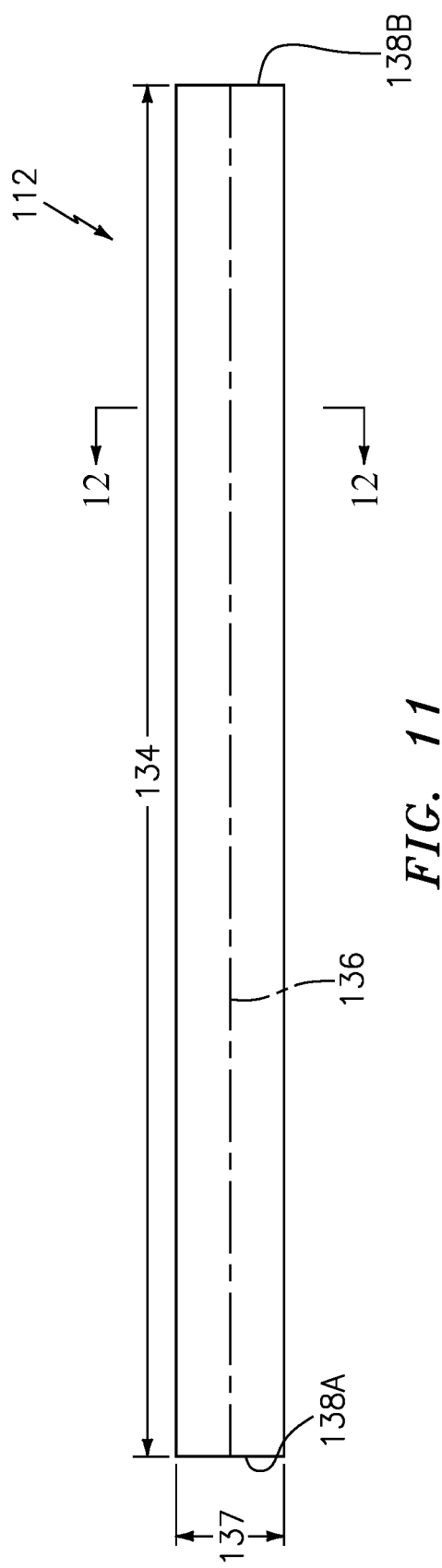
FIG. 11 is an illustration of the seal element in a relaxed and/or unassembled state.

The seal element 112 of FIG. 11 (shown in a relaxed and/or non-assembled state) is configured as an elongated seal element. This seal element 112, for example, has a relatively small cross-sectional width 132 (e.g., diameter) and a relatively long longitudinal length 134. This longitudinal length 134 may be measured along a longitudinal centerline 136 of the seal element 112 between opposing ends 138A and 138B (generally referred to as "138") of the seal element 112. The longitudinal length 134 may be at least four times (4×), ten times (10×), fifteen times (15×), twenty times (20×), or more the cross-sectional width 137; e.g., the length 134 may be between 10× and 30× the width 137. The present disclosure, however, is not limited to the foregoing exemplary length-to-width ratios. The longitudinal length 134 may be sized such that the seal element 112 covers one or more or each of the gaps between the elements 90, 84, 42, 110; see FIGS. 16 and 17. The longitudinal length 134 may also be sized such that the seal element 112 engages the locators 116 in order to retain seal element 112 in place during operation.

Figure 12:
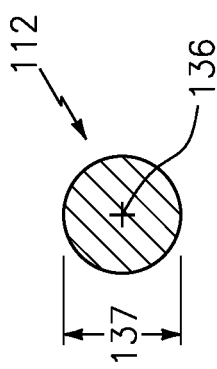
FIG. 12 is a cross-sectional illustration of the seal element taken along line 12-12 in FIG. 11.
Figure 13:
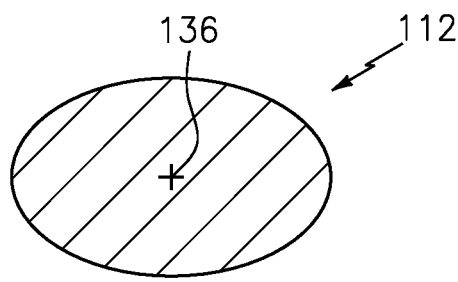
FIGS. 13-14B are cross-sectional illustrations of alternate seal element geometries.
Figure 14A:
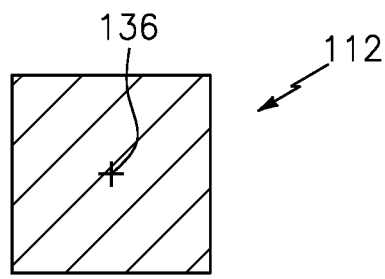
Figure 14B:
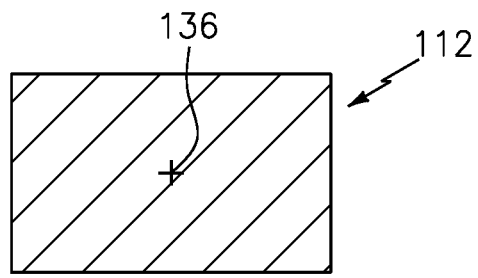

In a relaxed/unassembled state as shown in FIG. 12, the seal element 112 may have a circular cross-sectional geometry when viewed, for example, in a plane perpendicular to the longitudinal centerline 136. The present disclosure, however, is not limited to such an exemplary seal element cross-sectional geometry. For example, in other embodiments, the seal element 112 may be configured with a non-circular cross-sectional geometry. Examples of non-circular cross-sectional geometries include, but are not limited to, an oval or elliptical cross-sectional geometry (e.g., see FIG. 13), a rectangular cross-sectional geometry (e.g., see FIGS. 14A and 14B), or any other desired cross-sectional geometry.

The seal element 112 may be configured as a compliant seal element. The seal element 112, for example, may be configured as a rope seal element (e.g., a braided wire rope seal element), a (e.g., single strand) wire seal element or a sheet material (e.g., metal) seal element.

The seal element 112 is formed from seal element material, which may be the same as or different than the platform seal material. Examples of the seal element material may include, but are not limited to, metal and polymeric material. Examples of the metal include, but are not limited to, aluminum (Al), nickel (Ni), titanium (Ti), and alloys of any one or more of the foregoing. Examples of the polymetric material may include, but are not limited to, fiber-reinforced thermoplastic material and fiber-reinforced thermoset material.

Referring to FIGS. 9 and 10, the seal element 112 is configured with the platform seal 110. The seal element 112 of FIG. 9, for example, is wrapped substantially around the perimeter of the platform seal 110 and interwoven between the element locators 116.

One or more intermediate segments 140-142 (e.g., longitudinal lengths along the centerline 136) of the seal element 112 are seated on the rim shelf 130 and abutted against the element locators 116. The first intermediate segment 140 extends laterally along the seal base second end 120 (or alternatively the seal base first end 118). The second intermediate segment 141 extends (e.g., substantially) axially along the seal base first side 122A between the seal base first and second ends 118 and 120. This second intermediate segment 141 is angularly offset from the first intermediate segment 140 by a first offset angle 144; e.g., an obtuse angle or alternatively a right angle or an acute angle. The third intermediate segment 142 extends (e.g., substantially) axially along the seal base second side 122B between the seal base first and second ends 118 and 120. This third intermediate segment 142 is angularly offset from the first intermediate segment 140 by a second offset angle 146; e.g., an acute angle or alternatively a right angle or an obtuse angle. Note, the seal locators 116 are shaped such that the locators 116 are operable to retain the position of the seal element 112 in a position where the seal element 112 is operable to fill/cover one or more or each of the gaps between the elements 90, 84, 42, 110; see FIGS. 16 and 17.

A first end segment 148 (e.g., longitudinal length along the centerline 136) of the seal element 112 is bent around the first element locator 116A and projects into the first groove 129A from the seal base first end 118 (or alternatively the seal base second end 120). The first end segment 148 is bent back and axially overlaps the second intermediate segment 141. A second end segment 150 (e.g., longitudinal length along the centerline 136) of the seal element 112 is bent around the second element locator 116B and projects into the second groove 129B from the seal base first end 118 (or alternatively the seal base second end 120). The second end segment 150 is bent back and axially overlaps the third intermediate segment 142. The end segments 148 and 150 may thereby attach (e.g., secure, interconnect and/or lock) the seal element 112 to the platform seal 110. With this arrangement, the centerline 136 of the seal element 112 follows a tortuous trajectory.

Figure 15:
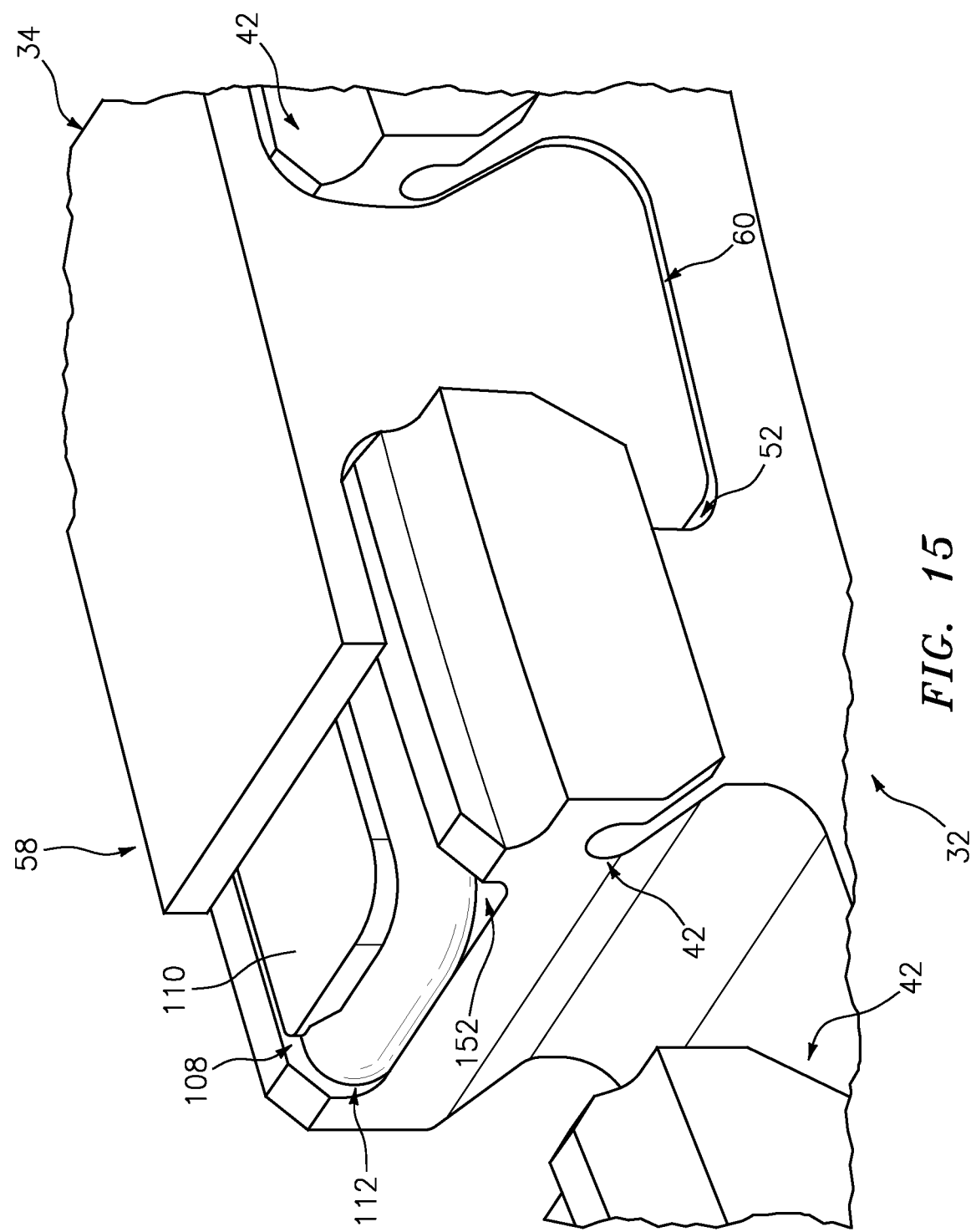
FIG. 15 is a perspective illustration of the platform seal and the seal element configured between a rim lug and a rotor blade platform, where the rotor blade is shown without an airfoil for easy of illustration.

Referring to FIG. 15, each seal component pair 108 is arranged with a respective one of the rim lugs 42 such that each seal component pair 108 is uniquely associated with a single one of the rim lugs 42. Each seal component pair 108 is received, inset and seated within a respective lug groove 152 in the respective rim lug 42. In a rest state, the platform seal 110 as well as the seal element 112 may radially rest against the respective lug 42. However, during rotational equipment operation, the platform seal 110 and/or the seal element 112 may be forced radially outward (e.g., via centrifugal force) against the rotor blade platforms 58 of adjacent rotor blades 34 as shown, for example, in FIG. 16.

Figure 16:
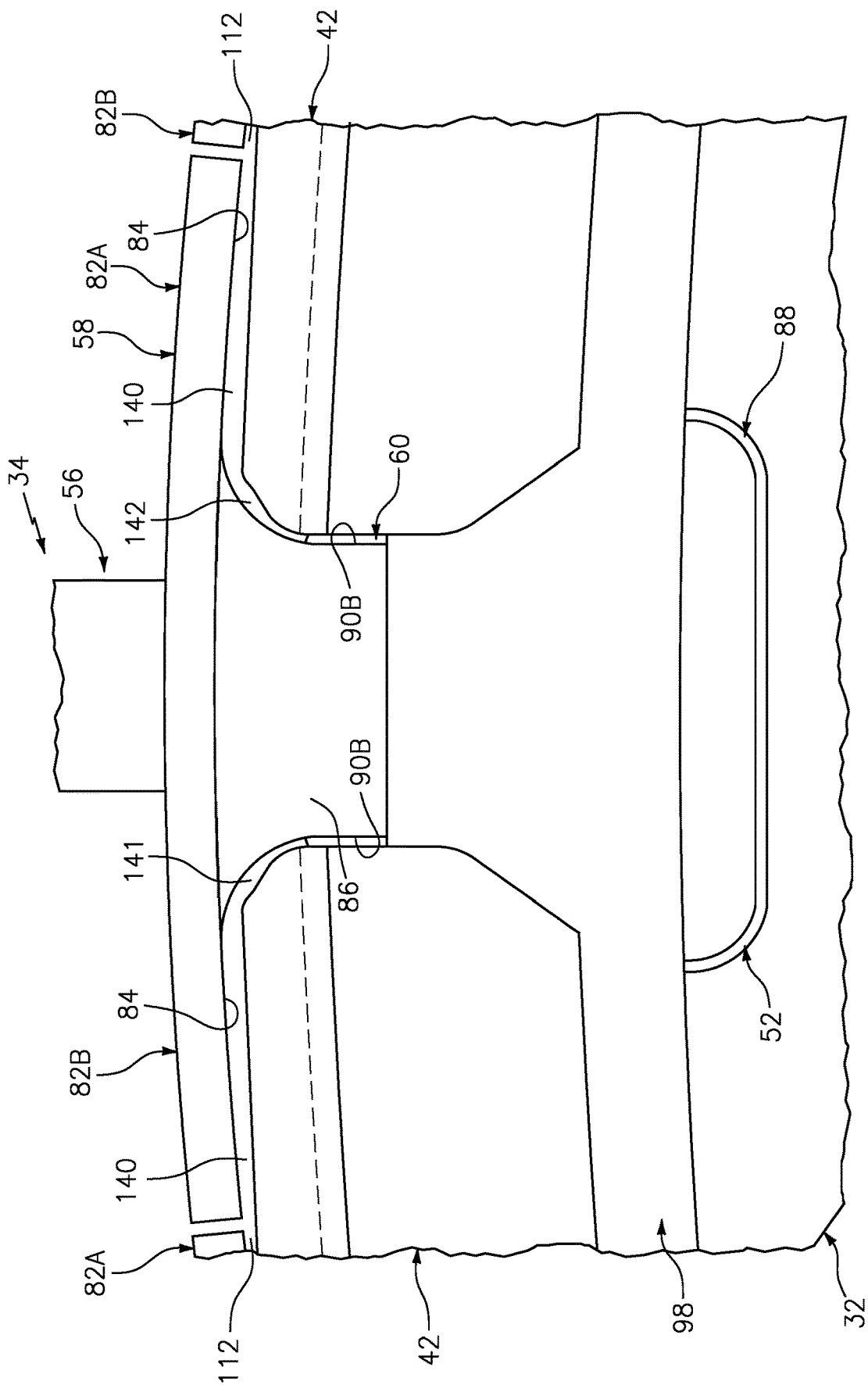
FIG. 16 is a partial illustration of the rotor assembly configured with a plurality of the platform seals and a plurality of the seal elements.

In the state of FIG. 16, the first intermediate segment 140 of the seal element 112 may sealingly engage (e.g., be pressed radially against, abut and contact) the first and/or second segments of the inner platform surfaces 84 of adjacent rotor blades 34. The first intermediate segment 140 may thereby substantially seal the radial gap between the respective rim lug 42 and the adjacent rotor blade platforms 58.

Each intermediate segment 141, 142 may sealingly engage (e.g., be pressed against, abut and contact) a corner between a respective segment of the inner platform surface 84 and a respective neck side surface 90. Each intermediate segment 141, 142 may also or alternatively sealingly engage (e.g., be pressed laterally against, abut and contact) the respective neck side surface 90. Each intermediate segment 141, 142 may thereby at least partially seal the lateral gap between the respective rim lug 42 and the respective neck side surface 90; see also FIG. 17. Here, a portion of the centerline 136 within each intermediate segment 141, 142 extends along and is parallel with the mount 60.

Figure 17:
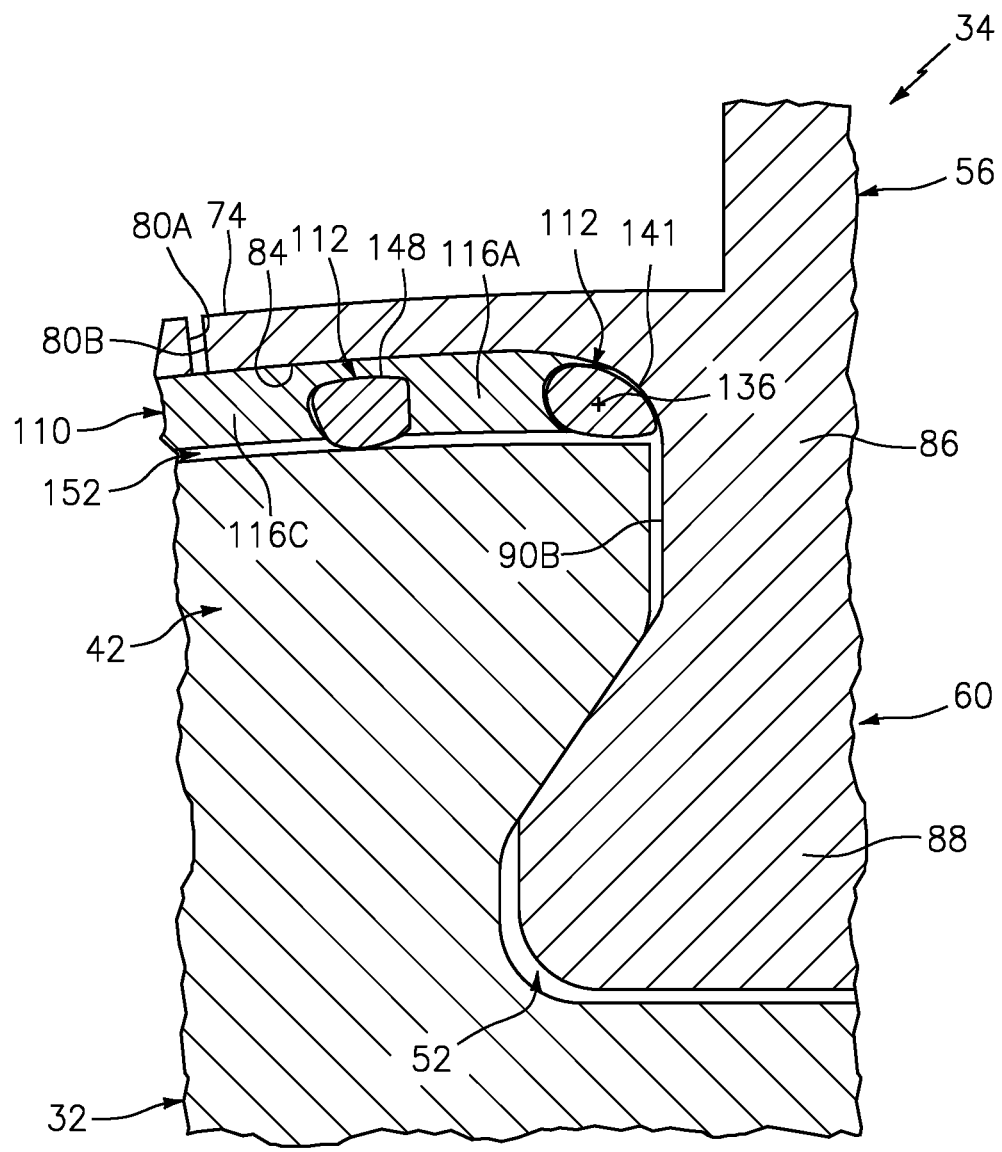
FIG. 17 is a partial cross-sectional illustration of the rotor assembly of FIG. 16.

Referring to FIG. 17, each platform seal 110 may also sealingly engage (e.g., be pressed radially against, abut and contact) the first and/or second segments of the inner platform surfaces 84 of adjacent rotor blades 34. The platform seal 110 may thereby substantially seal the lateral gap between the edges 80 of the adjacent rotor blade platforms 58. The platform seal 110 may also further seal the radial gap between the respective rim lug 42 and the adjacent rotor blade platforms 58.

Figure 18:
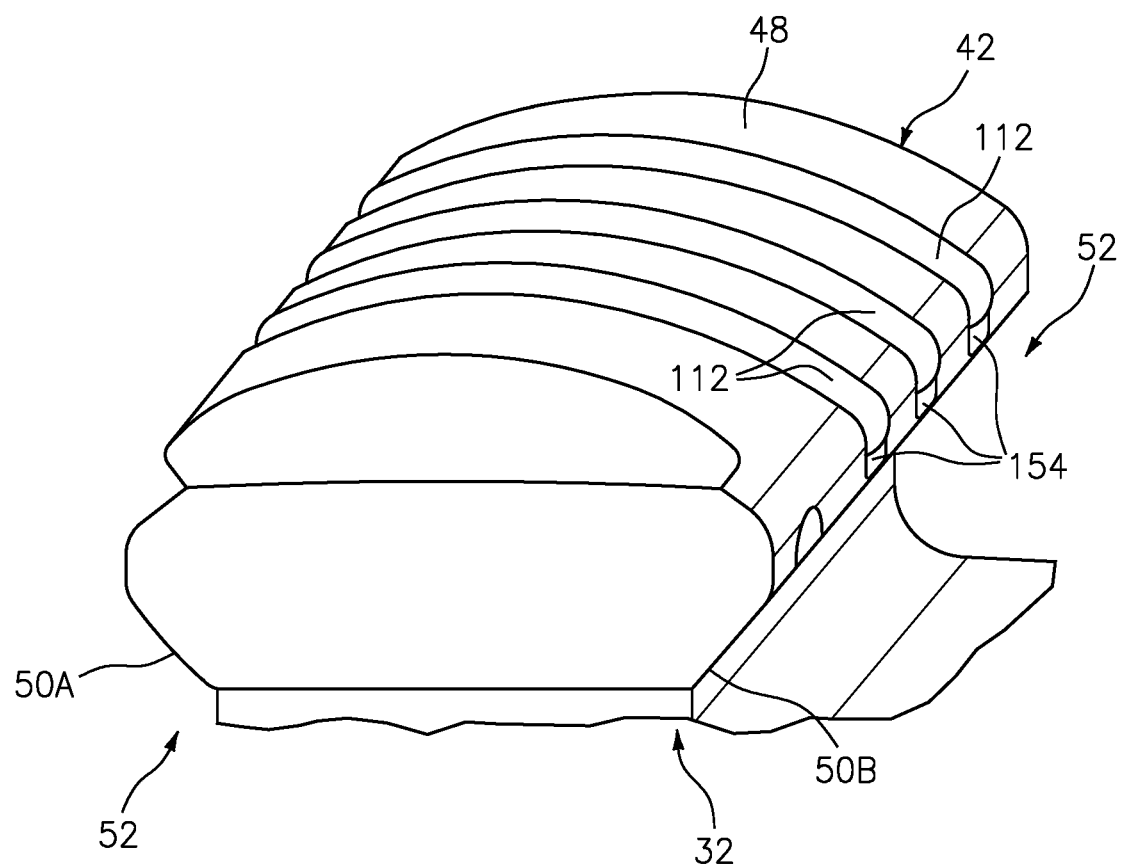
FIG. 18 is a perspective illustration of a rim lug configured with a plurality of the seal elements and without the platform seal.

The seal assembly 106 of FIG. 18 includes a plurality of sets of the seal elements 112. Each set of the seal elements 112 includes one or more seal elements 112, which may have a similar configuration as described above. Each of the seal elements 112 in a set is disposed in a respective groove 154 in a respective one of the rim lugs 42. With this arrangement, each of the seal elements 112 may extend laterally across the respective rim lug 42; e.g., between the opposing sides 50. It is worth nothing, the seal elements 112 are not limited to single or multiple wire seal configuration. As discussed above, each seal element 112 can be constructed out of polymetric material including, but are not limited to, fiber-reinforced thermoplastic material and fiber-reinforced thermoset material. Alternatively, each seal element 112 can be constructed out of shaped metal sheet to achieve the desired flow restriction between the lug surface 48 and the rotor blade platforms 58.

Figure 19:
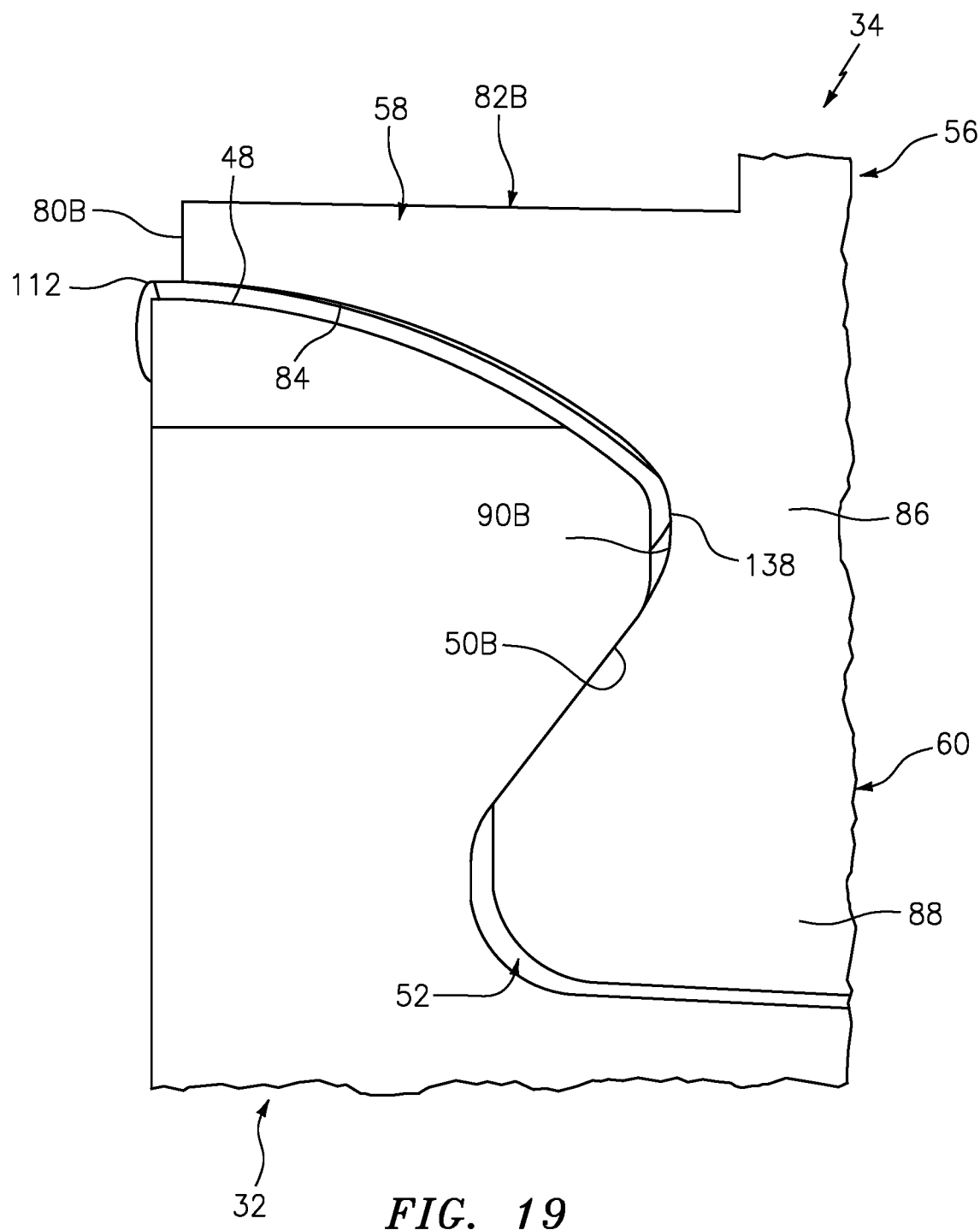
FIG. 19 is a partial illustration of an interface between the rotor blade platform and the rim lug of FIG. 18.

During rotational equipment operation, the seal elements 112 may be forced radially outward (e.g., via centrifugal force) against the rotor blade platforms 58 of adjacent rotor blades 34 as shown, for example, in FIG. 19. In this state, each seal element 112 may sealingly engage (e.g., be pressed radially against, abut and contact) the first and/or second segments of the inner platform surfaces 84 of adjacent rotor blades 34 (one shown in FIG. 19). The seal elements 112 may thereby substantially seal the radial gap between the respective rim lug 42 and the adjacent rotor blade platforms 58. In addition, ends 138 of the seal elements 112 may respectively sealingly engage (e.g., be pressed laterally against, abut and contact) the respective neck side surface 90. Each seal element end 138 may thereby at least partially seal the lateral gap between the respective rim lug 42 and the respective neck side surface 90.

It is also worth noting, in the embodiment of FIG. 19, the inner surface 84 of each platform segment 82 extends radially inward as that inner surface 84 extends from the respective edge 80 to the mount 60. Similarly, the lug surface 48 follows (e.g., has the same curvature as) the inner surfaces 84 of the adjacent rotor blade platforms 58. With this arrangement, a size (e.g., a radial height) of the lateral gap between the lugs 42 and the rotor blade mounts 60 may be reduced as compared to, for example, the arrangement shown in FIG. 16. Thus, the present disclosure contemplates providing such a sloped inner platform surface 84 and lug surface 48 for each embodiment disclosed herein.

Figure 20:
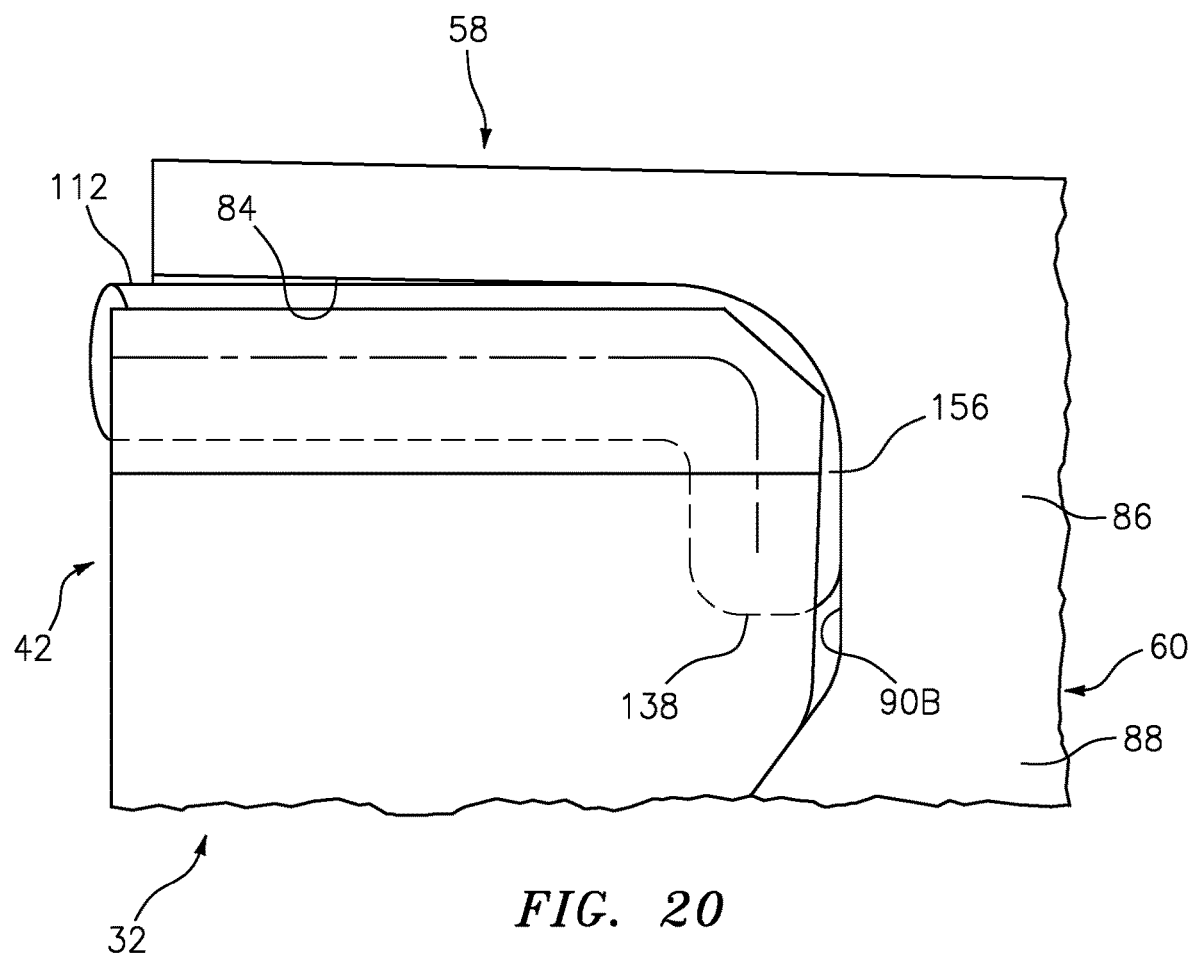
FIG. 20 is a partial illustration of an interface between another rotor blade platform and another rim lug.

In some embodiments, referring to FIG. 20, one or more or each of the seal elements 112 may each be configured with one or more bent end segments 156. Each bent end segment 156 is configured to extend radially along the mount 60 and the surface 90 so as to further seal the lateral gap.

Figure 21:
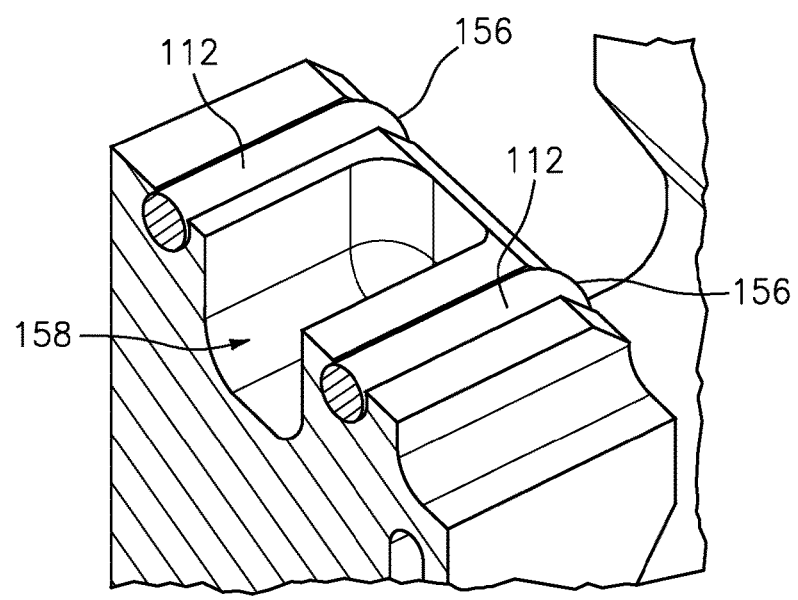
FIG. 21 is a partial perspective illustration of the rim lug of FIG. 20 configured with a plurality of the seal elements.

In some embodiments, referring to FIG. 21, one or more or each of the rim lugs 42 may include a pocket 158. This pocket 158 may be arranged axially between an adjacent pair of the seal elements 112. The pocket 158 may serve to reduce the rotating mass of the rotor disk 32 and/or provide a fluid path within the rotor assembly 30.

Figure 22:
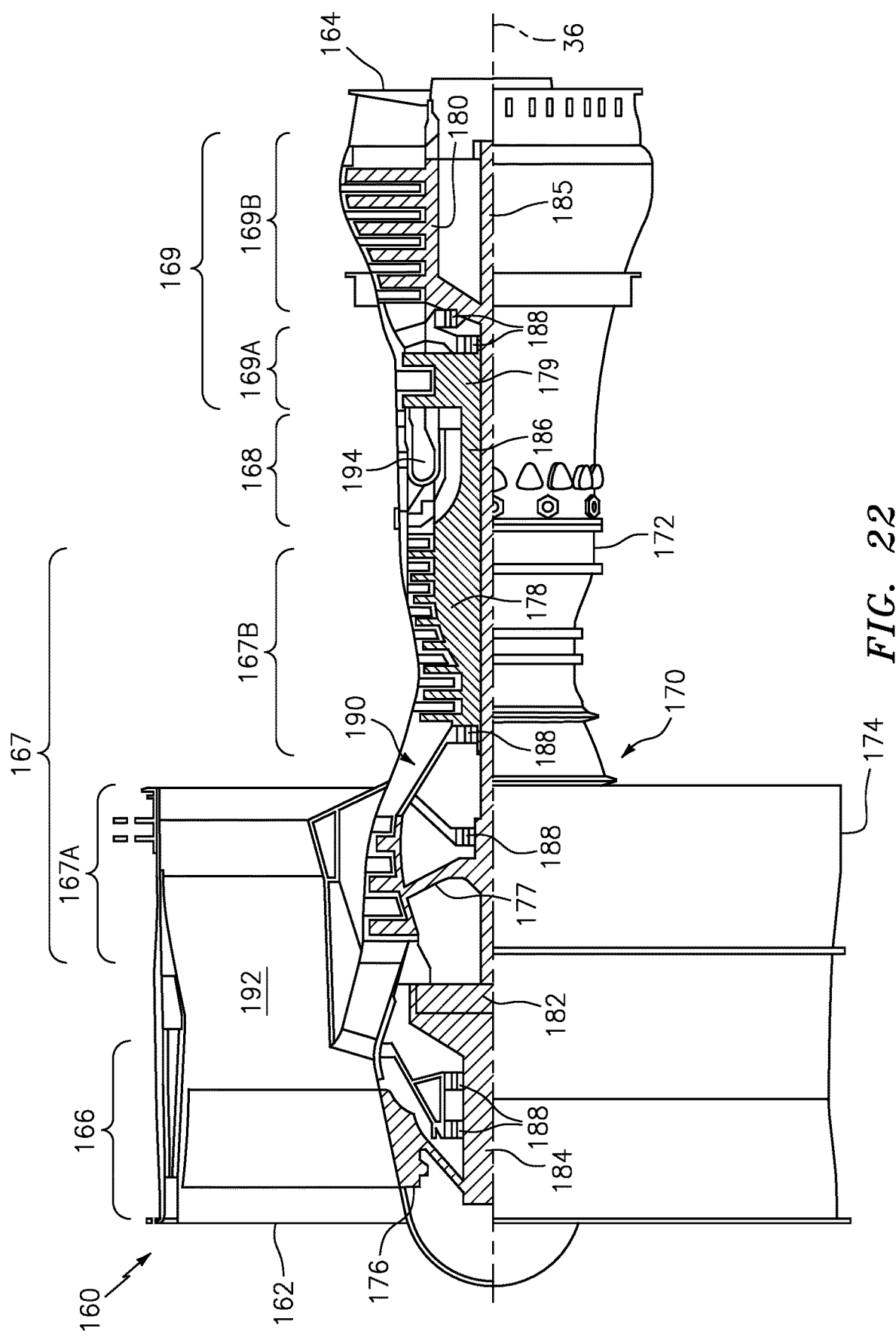
FIG. 22 is a side cutaway illustration of a gas turbine engine.

FIG. 22 is a side cutaway illustration of a geared turbine engine 160 with which the rotor assembly 30 of FIG. 1 may be included. This turbine engine 160 extends along the rotational axis 36 between an upstream airflow inlet 162 and a downstream airflow exhaust 164. The turbine engine 160 includes a fan section 166, a compressor section 167, a combustor section 168 and a turbine section 169. The compressor section 167 includes a low pressure compressor (LPC) section 167A and a high pressure compressor (HPC) section 167B. The turbine section 169 includes a high pressure turbine (HPT) section 169A and a low pressure turbine (LPT) section 169B.

The engine sections 166-169B are arranged sequentially along the rotational axis 36 within an engine housing 170. This housing 170 includes an inner case 172 (e.g., a core case) and an outer case 174 (e.g., a fan case). The inner case 172 may house one or more of the engine sections 167A-169B; e.g., an engine core. The outer case 174 may house at least the fan section 166.

Each of the engine sections 166, 167A, 167B, 169A and 169B includes a respective rotor 176-180, any one of which may be configured as or may include the rotor assembly 30 of FIG. 1. The rotor assembly 30, for example, may be included in one of the compressor rotors 177 or 178. Each of the rotors 176-180 of FIG. 22 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 176 is connected to a gear train 182, for example, through a fan shaft 184. The gear train 182 and the LPC rotor 177 are connected to and driven by the LPT rotor 180 through a low speed shaft 185. The HPC rotor 178 is connected to and driven by the HPT rotor 179 through a high speed shaft 186. The shafts 184-186 are rotatably supported by a plurality of bearings 188; e.g., rolling element and/or thrust bearings. Each of these bearings 188 is connected to the engine housing 170 by at least one stationary structure such as, for example, an annular support strut.

During operation, air enters the turbine engine 160 through the airflow inlet 162. This air is directed through the fan section 166 and into a core gas path 190 (e.g., the gas path 72; see FIG. 4) and a bypass gas path 192. The core gas path 190 extends sequentially through the engine sections 167A-169B. The air within the core gas path 190 may be referred to as "core air". The bypass gas path 192 extends through a bypass duct, which bypasses the engine core. The air within the bypass gas path 192 may be referred to as "bypass air".

The core air is compressed by the compressor rotors 177 and 178 and directed into a combustion chamber 194 of a combustor in the combustor section 168. Fuel is injected into the combustion chamber 194 and mixed with the compressed core air to provide a fuel-air mixture. This fuel air mixture is ignited and combustion products thereof flow through and sequentially cause the turbine rotors 179 and 180 to rotate. The rotation of the turbine rotors 179 and 180 respectively drive rotation of the compressor rotors 178 and 177 and, thus, compression of the air received from a core airflow inlet. The rotation of the turbine rotor 180 also drives rotation of the fan rotor 176, which propels bypass air through and out of the bypass gas path 192. The propulsion of the bypass air may account for a majority of thrust generated by the turbine engine 160, e.g., more than seventy-five percent (75%) of engine thrust. The turbine engine 160 of the present disclosure, however, is not limited to the foregoing exemplary thrust ratio.

The rotor assembly 30 may be included in various turbine engines other than the one described above as well as in other types of rotational equipment. The rotor assembly 30, for example, may be included in a geared turbine engine where a gear train connects one or more shafts to one or more rotors in a fan section, a compressor section and/or any other engine section. Alternatively, the rotor assembly 30 may be included in a turbine engine configured without a gear train. The rotor assembly 30 may be included in a geared or non-geared turbine engine configured with a single spool, with two spools (e.g., see FIG. 22), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A rotor assembly for a piece of rotational equipment, comprising:
   a rotor disk configured to rotate about a rotational axis;
   a rotor blade including an airfoil, a platform and a mount attaching the rotor blade to the rotor disk;
   a seal element seated in a groove of the rotor disk, the seal element configured to sealingly engage the platform and the mount, and the seal element comprising a rope seal element or a wire seal element; and
   a second seal element seated in a second groove of the rotor disk, the seal element and the second seal element axially offset along the rotational axis, and the second seal element configured to sealingly engage the platform and the mount.

2. The rotor assembly of claim 1, wherein the mount includes a root and a neck; and
   the seal element is configured to sealingly engage the neck.

3. The rotor assembly of claim 1, wherein the seal element is configured to radially abut against the platform; and
   laterally abut against the mount.

4. The rotor assembly of claim 1, wherein the rotor disk includes a lug and a slot partially formed by the lug;
   the mount is seated within the slot; and
   the seal element extends laterally across the lug.

5. The rotor assembly of claim 1, wherein the seal element comprises polymeric material.

6. The rotor assembly of claim 1, wherein
   an inner surface of the platform extends radially inwards as the inner surface extends from a lateral distal edge of the platform to the mount; and
   a lug surface of the rotor disk follows the inner surface.

7. The rotor assembly of claim 1, wherein the rotor blade comprises a compressor blade.

8. The rotor assembly of claim 1, wherein the second seal element comprises a rope seal element.

9. The rotor assembly of claim 1, further comprising:
   a third seal element seated in a third groove of the rotor disk;
   the third seal element axially offset from the seal element and the second seal element along the rotational axis; and
   the third seal element configured to sealingly engage the platform and the mount.

10. The rotor assembly of claim 1, wherein the second seal element comprises a wire seal element.

* * * * *